US010362518B2

(12) United States Patent
Wu (10) Patent No.: US 10,362,518 B2
(45) Date of Patent: Jul. 23, 2019

(54) METHOD FOR STARTING INTER-FREQUENCY MEASUREMENT AND RELATED DEVICE

(71) Applicant: Huawei Technologies Co., Ltd., Shenzhen, Guangdong (CN)

(72) Inventor: Jianming Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 41 days.

(21) Appl. No.: 15/842,578

(22) Filed: Dec. 14, 2017

(65) Prior Publication Data

US 2018/0109984 A1 Apr. 19, 2018

Related U.S. Application Data

(63) Continuation of application No. PCT/CN2016/086729, filed on Jun. 22, 2016.

(30) Foreign Application Priority Data

Jun. 30, 2015 (CN) .......................... 2015 1 0372905

(51) Int. Cl.
*H04W 24/10* (2009.01)
*H04W 36/00* (2009.01)
(Continued)

(52) U.S. Cl.
CPC ....... *H04W 36/0088* (2013.01); *H04W 12/06* (2013.01); *H04W 24/10* (2013.01); *H04W 36/32* (2013.01); *H04W 36/22* (2013.01)

(58) Field of Classification Search
CPC . H04W 36/0088; H04W 24/10; H04W 12/06; H04W 36/32
See application file for complete search history.

(56) References Cited

U.S. PATENT DOCUMENTS 8,837,427 B2 * 9/2014 Shirota ............. H04W 36/0022
370/331
9,380,594 B1 * 6/2016 Malmirchegini ..... H04W 72/10
(Continued)

FOREIGN PATENT DOCUMENTS

CN 101557628 A 10/2009
CN 102711167 A 10/2012
(Continued)

OTHER PUBLICATIONS

China Unicom, "Consideration on WLAN/3GPP inteworking", 3GPP TSG RAN WG2 Meeting #81bis, R2-131029, Apr. 2013, 2 pages.

*Primary Examiner* — Jay P Patel (57) ABSTRACT

A method for starting inter-frequency measurement is provided. The method is applied to an inter-frequency network, the inter-frequency network includes a first base station and a second base station, there is an overlapping area between a signal coverage area of the first base station and a signal coverage area of the second base station, and an access priority of the second base station is higher than an access priority of the first base station; user equipment accesses the first base station; a distance between the second base station and an AP is less than a first distance threshold, and the AP is controlled by an AC. The method includes: receiving, by the AC, a user authentication request; obtaining an identifier of the user equipment from the user authentication request; and sending an inter-frequency measurement request to the user equipment according to the identifier of the user equipment.

18 Claims, 4 Drawing Sheets

(51) Int. Cl.
*H04W 36/32* (2009.01)
*H04W 12/06* (2009.01)
*H04W 36/22* (2009.01)

(56) References Cited

U.S. PATENT DOCUMENTS

| | | | | |
|---|---|---|---|---|
| 9,674,743 | B2* | 6/2017 | Kim | H04W 24/10 |
| 9,742,647 | B2* | 8/2017 | Kazmi | H04L 1/0027 |
| 2004/0102195 | A1* | 5/2004 | Naghian | H04W 4/02 |
| | | | | 455/456.1 |
| 2010/0111035 | A1* | 5/2010 | Eskicioglu | H04W 36/04 |
| | | | | 370/331 |
| 2010/0113035 | A1* | 5/2010 | Eskicioglu | H04W 36/0085 |
| | | | | 455/444 |
| 2011/0244863 | A1* | 10/2011 | Matsuo | H04W 36/04 |
| | | | | 455/436 |
| 2011/0263242 | A1 | 10/2011 | Tinnakornsrisuphap et al. | |
| 2012/0238268 | A1* | 9/2012 | Radulescu | H04W 36/0061 |
| | | | | 455/435.1 |
| 2012/0244903 | A1* | 9/2012 | Fong | H04W 8/20 |
| | | | | 455/517 |
| 2012/0309396 | A1 | 12/2012 | Aoyagi et al. | |
| 2013/0059610 | A1* | 3/2013 | Siomina | H04W 24/10 |
| | | | | 455/456.6 |
| 2013/0079007 | A1* | 3/2013 | Nagaraja | H04W 36/0005 |
| | | | | 455/436 |
| 2014/0119264 | A1* | 5/2014 | Shauh | H04W 72/005 |
| | | | | 370/312 |
| 2014/0119265 | A1* | 5/2014 | Shauh | H04W 4/06 |
| | | | | 370/312 |
| 2014/0133477 | A1* | 5/2014 | Siomina | H04W 56/0055 |
| | | | | 370/350 |
| 2014/0293858 | A1* | 10/2014 | Kalhan | H04W 36/0072 |
| | | | | 370/311 |
| 2014/0362716 | A1* | 12/2014 | Zhang | H04W 24/10 |
| | | | | 370/252 |
| 2015/0056995 | A1 | 2/2015 | Baillargeon | |
| 2015/0133115 | A1* | 5/2015 | Jung | H04W 48/16 |
| | | | | 455/434 |
| 2016/0057708 | A1* | 2/2016 | Siomina | H04W 52/243 |
| | | | | 455/452.2 |
| 2016/0150432 | A1 | 5/2016 | Qin | |
| 2018/0035342 | A1* | 2/2018 | Fujishiro | H04W 16/32 |

FOREIGN PATENT DOCUMENTS

| | | |
|---|---|---|
| CN | 103813375 A | 5/2014 |
| CN | 104244283 A | 12/2014 |
| CN | 104980949 A | 10/2015 |
| EP | 3261378 A | 12/2017 |
| JP | 2004064541 A | 2/2004 |
| JP | 2008289071 A | 11/2008 |
| JP | 2013526189 A | 6/2013 |
| WO | 2011065572 A1 | 6/2011 |
| WO | 2013162331 A1 | 10/2013 |
| WO | 2014174484 A2 | 10/2014 |

* cited by examiner

METHOD FOR STARTING INTER-FREQUENCY MEASUREMENT AND RELATED DEVICE

CROSS-REFERENCE TO RELATED APPLICATIONS

This application is a continuation of International Application No. PCT/CN2016/086729, filed on Jun. 22, 2016, which claims priority to Chinese Patent Application No. 201510372905.6, filed on Jun. 30, 2015. The disclosures of the aforementioned applications are hereby incorporated by reference in their entireties.

TECHNICAL FIELD

Embodiments of the present application relate to the field of communications technologies, and in particular, to a method for starting inter-frequency measurement and a related device.

BACKGROUND

In some scenarios, a network includes a first base station and a second base station. There is an overlapping area between a signal coverage area of the first base station and a signal coverage area of the second base station, and an access priority of the second base station is higher than an access priority of the first base station. Therefore, when user equipment that accesses the first base station enters the overlapping area, the user equipment needs to be handed over to the second base station, so that the second base station performs offload on the first base station.

If the first base station and the second base station are located in different frequencies, to enable a handover of the user equipment to the second base station from the access device, there is a need to enable the user equipment to start inter-frequency measurement to measure a signal strength of the second base station. If the signal strength of the second base station is greater than a handover threshold, the user equipment is handed over to the second base station from the access device.

Currently, to start inter-frequency measurement, the first base station sets a starting threshold and sends the starting threshold to the user equipment, and the user equipment starts inter-frequency measurement when determining that a signal strength of the first base station is less than the starting threshold. Apparently, in this starting manner, inter-frequency measurement is not started when the signal strength of the first base station is greater than the starting threshold. As a result, the user equipment is unable to be handed over to the second base station from the access device, and the second base station cannot perform offload on the first base station.

SUMMARY

Embodiments of the present disclosure provide a method for starting inter-frequency measurement and a related device to resolve a technical problem that user equipment is unable to be handed over from an access device, so that a second base station better performs offload on a first base station.

For this purpose, technical solutions for resolving the technical problem in the embodiments of the present disclosure are as follows:

According to a first aspect, an embodiment of the present disclosure provides a method for starting inter-frequency measurement, where the method is applied to an inter-frequency network, the inter-frequency network includes a first base station and a second base station, there is an overlapping area between a signal coverage area of the first base station and a signal coverage area of the second base station, an access priority of the second base station is higher than an access priority of the first base station, and the first base station and the second base station are located in different frequencies; user equipment accesses the first base station; a distance between the second base station and a wireless access point AP is less than a first distance threshold, and the AP is controlled by an access controller AC; and the method includes:

receiving, by the AC, a user authentication request sent by the user equipment, where the user authentication request is used to request to authenticate whether the user equipment is able to access the AP, and the user authentication request includes an identifier of the user equipment;

obtaining, by the AC, the identifier of the user equipment from the user authentication request; and sending, by the AC, an inter-frequency measurement request to the user equipment according to the identifier of the user equipment, where the inter-frequency measurement request is used to request the user equipment to start inter-frequency measurement.

In a first possible implementation of the first aspect, the sending, by the AC, an inter-frequency measurement request to the user equipment includes:

determining, by the AC, that a distance between the AP and the user equipment is less than a second distance threshold, and sending the inter-frequency measurement request to the user equipment.

With reference to the first aspect or the first possible implementation of the first aspect, in a second possible implementation of the first aspect, the sending, by the AC, an inter-frequency measurement request to the user equipment includes:

sending, by the AC, the inter-frequency measurement request to the user equipment by using a base station device, where the base station device is the first base station or a base station controller of the first base station.

According to a second aspect, an embodiment of the present disclosure provides a method for starting inter-frequency measurement, where the method is applied to an inter-frequency network, the inter-frequency network includes a first base station and a second base station, there is an overlapping area between a signal coverage area of the first base station and a signal coverage area of the second base station, an access priority of the second base station is higher than an access priority of the first base station, and the first base station and the second base station are located in different frequencies; user equipment accesses the first base station; a distance between the second base station and a wireless access point AP is less than a distance threshold, and the AP is controlled by an access controller AC; and the method includes:

determining, by the user equipment, that the user equipment enters a signal coverage area of the AP, and sending a user authentication request to the AC, where the user authentication request is used to request to authenticate whether the user equipment is able to access the AP, and the user authentication request includes an identifier of the user equipment;

receiving, by the user equipment, an inter-frequency measurement request sent by the AC, where the inter-frequency measurement request is used to request the user equipment to start inter-frequency measurement; and starting, by the user equipment, inter-frequency measurement according to the inter-frequency measurement request.

In a first possible implementation of the second aspect, the receiving, by the user equipment, an inter-frequency measurement request sent by the AC includes:

receiving, by the user equipment, the inter-frequency measurement request sent by the AC by using a first base station device, where the first base station device is the first base station or a base station controller of the first base station.

With reference to the second aspect or the first possible implementation of the second aspect, in a second possible implementation of the second aspect, the method further includes:

sending, by the user equipment, a measurement result of inter-frequency measurement to a second base station device;

receiving, by the user equipment, an equipment handover request sent by the second base station device, where the equipment handover request is used to request the user equipment to access the second base station; and accessing, by the user equipment, the second base station according to the equipment handover request, where the second base station device is the first base station or the base station controller of the first base station.

According to a third aspect, an embodiment of the present disclosure provides an AC, where the AC is used in an inter-frequency network, the inter-frequency network includes a first base station and a second base station, there is an overlapping area between a signal coverage area of the first base station and a signal coverage area of the second base station, an access priority of the second base station is higher than an access priority of the first base station, and the first base station and the second base station are located in different frequencies; user equipment accesses the first base station; a distance between the second base station and a wireless access point AP is less than a first distance threshold, and the AP is controlled by the AC; and the AC includes:

a receiving unit, configured to receive a user authentication request sent by the user equipment, where the user authentication request is used to request to authenticate whether the user equipment is able to access the AP, and the user authentication request includes an identifier of the user equipment;

an obtaining unit, configured to obtain the identifier of the user equipment from the user authentication request; and a sending unit, configured to send an inter-frequency measurement request to the user equipment according to the identifier of the user equipment, where the inter-frequency measurement request is used to request the user equipment to start inter-frequency measurement.

In a first possible implementation of the third aspect, when sending the inter-frequency measurement request to the user equipment, the sending unit is specifically configured to determine that a distance between the AP and the user equipment is less than a second distance threshold, and send the inter-frequency measurement request to the user equipment.

With reference to the third aspect or the first possible implementation of the third aspect, in a second possible implementation of the third aspect, when sending the inter-frequency measurement request to the user equipment, the sending unit is specifically configured to send the inter-frequency measurement request to the user equipment by using a base station device, where the base station device is the first base station or a base station controller of the first base station.

According to a fourth aspect, an embodiment of the present disclosure provides user equipment, where the user equipment is used in an inter-frequency network, the inter-frequency network includes a first base station and a second base station, there is an overlapping area between a signal coverage area of the first base station and a signal coverage area of the second base station, an access priority of the second base station is higher than an access priority of the first base station, and the first base station and the second base station are located in different frequencies; the user equipment accesses the first base station; a distance between the second base station and a wireless access point AP is less than a distance threshold, and the AP is controlled by an access controller AC; and the user equipment includes:

a sending unit, configured to determine that the user equipment enters a signal coverage area of the AP, and send a user authentication request to the AC, where the user authentication request is used to request to authenticate whether the user equipment is able to access the AP, and the user authentication request includes an identifier of the user equipment;

a receiving unit, configured to receive an inter-frequency measurement request sent by the AC, where the inter-frequency measurement request is used to request the user equipment to start inter-frequency measurement; and a starting unit, configured to start inter-frequency measurement according to the inter-frequency measurement request.

In a first possible implementation of the fourth aspect, when receiving an inter-frequency measurement request sent by the AC, the receiving unit is specifically configured to receive the inter-frequency measurement request sent by the AC by using a first base station device, where the first base station device is the first base station or a base station controller of the first base station.

With reference to the fourth aspect or the first possible implementation of the fourth aspect, in a second possible implementation of the fourth aspect, the user equipment further includes a handover unit;

the sending unit is further configured to send a measurement result of inter-frequency measurement to a second base station device;

the receiving unit is further configured to receive an equipment handover request sent by the second base station device, where the equipment handover request is used to request the user equipment to access the second base station; and the handover unit is configured to access the second base station according to the equipment handover request, where the second base station device is the first base station or the base station controller of the first base station.

It can be known from the foregoing technical solutions that, in the embodiments of the present disclosure, the user equipment no longer determines, according to a relationship between the signal strength of the first base station and the starting threshold, whether to start inter-frequency measurement. Instead, when the AP is close to the second base station, it is considered that entering the signal coverage area of the AP is equivalent to entering the signal coverage area of the second base station. Therefore, when the user equipment enters the signal coverage area of the AP, the AC receives the user authentication request from the user equipment, and the AC obtains the identifier of the user equipment, and sends the inter-frequency measurement request to the user equipment according to the identifier of the user equipment, so that the user equipment starts inter-frequency measurement. Therefore, this manner resolves a prior-art problem that inter-frequency measurement is not started when the signal strength of the first base station is greater than the starting threshold, so that the second base station better performs offload on the first base station.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

In some scenarios, a network includes a first base station and a second base station. There is an overlapping area between a signal coverage area of the first base station and a signal coverage area of the second base station, and an access priority of the second base station is higher than an access priority of the first base station. Therefore, when user equipment that accesses the first base station enters the overlapping area, the user equipment needs to be handed over to the second base station from the access device, so that the second base station performs offload on the first base station. For example, the first base station is a macro base station, and the second base station is a small cell. The small cell is deployed in a hotspot of the macro base station to perform offload on the macro base station. In addition, the small cell may also have a function of filling a coverage hole.

If the first base station and the second base station are located in different frequencies, to enable a handover of the user equipment to the second base station from the access device, there is a need to enable the user equipment to start inter-frequency measurement to measure a signal strength of the second base station. If the signal strength of the second base station is greater than a handover threshold, the user equipment is handed over to the second base station from the access device.

Currently, to start inter-frequency measurement, the first base station sets a starting threshold and sends the starting threshold to the user equipment, and the user equipment starts inter-frequency measurement when determining that a signal strength of the first base station is less than the starting threshold. Apparently, in this starting manner, inter-frequency measurement is not started when the signal strength of the first base station is greater than the starting threshold. As a result, the user equipment is unable to be handed over to the second base station from the access device, and the second base station cannot perform offload on the first base station.

To resolve the foregoing problem, a high starting threshold may be set, so that the user equipment starts inter-frequency measurement more easily for a handover from the access device, and the second base station better performs offload on the first base station. However, in this manner, because the high starting threshold is set, the user equipment frequently starts inter-frequency measurement. However, a handover is not performed when inter-frequency measurement is started beyond the signal coverage area of the second base station. Frequent starting of inter-frequency measurement not only increases power consumption of the user equipment, but also affects a throughput of transmission data.

In the embodiments of the present disclosure, a method for starting inter-frequency measurement and a related device are provided to resolve a problem that the user equipment is unable to be handed over from the access device, so that the second base station better performs offload on the first base station.

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person skilled in the art based on the embodiments of the present disclosure without creative efforts shall fall within the protection scope of the present disclosure.

In the specification, claims, and accompanying drawings of the present disclosure, the terms "first", "second", "third", "fourth", and the like are intended to distinguish between similar objects but do not necessarily indicate a specific order or sequence. It should be understood that the data termed in such a way are interchangeable in proper circumstances so that the embodiments of the present disclosure described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

Figure 1:
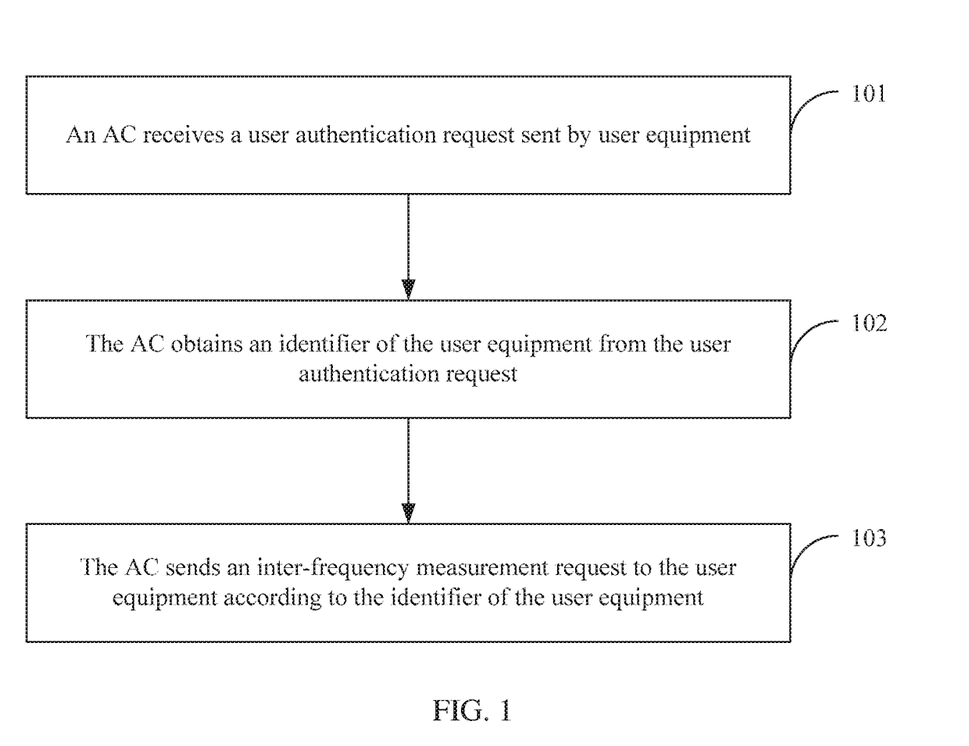
FIG. 1 is a schematic flowchart of a method embodiment according to an embodiment of the present disclosure.

Referring to FIG. 1, an embodiment of the present disclosure provides a method embodiment of a method for starting inter-frequency measurement.

The method in this embodiment is applied to an inter-frequency network. The inter-frequency network includes a first base station and a second base station. There is an overlapping area between a signal coverage area of the first base station and a signal coverage area of the second base station, that is, the signal coverage area of the first base station includes a part or the entire of the signal coverage area of the second base station. An access priority of the second base station is higher than an access priority of the first base station, and user equipment accesses the first base station. Therefore, when the user equipment that accesses the first base station enters the overlapping area, the user equipment needs to be handed over to the second base station from the access device. This indicates that the second base station is configured to perform offload on the first base station. The first base station and the second base station in the inter-frequency network are located in different frequencies.

Figure 2:
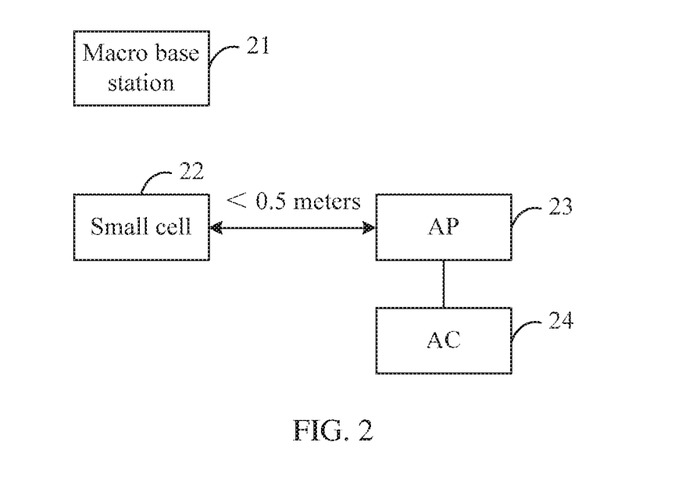
FIG. 2 is a schematic structural diagram of an inter-frequency network and a wireless access system according to an embodiment of the present disclosure.

In this embodiment, if a distance between the second base station and a wireless access point (AP) is less than a first distance threshold, it indicates that the second base station is close to the AP. For example, the first distance threshold may be set to 0.5 meters. The AP is controlled by an access controller (AC). Specifically, the AC may control an access device of the AP. In this embodiment, the first base station may be a macro base station or a small cell, and the second base station may be a small cell. For example, as shown in FIG. 2, the first base station is a macro base station 21, the second base station is a small cell 22, a distance between the small cell 22 and an AP 23 is less than 0.5 meters, and an AC 24 is configured to control the AP 23. A distance between the small cell 22 and the AP 23 may be specifically a distance between a point in a coverage area of the small cell 22 closest to the AP 23 and a point in a coverage area of the AP 23 closest to the small cell 22. The AP 23 and the AC 24 form a wireless access system.

This embodiment includes the following steps.

101: The AC receives a user authentication request sent by the user equipment.

When the user equipment enters a signal coverage area of the AP, the user equipment can discover the AP and send the user authentication request to the AC controlling the AP. The user authentication request is used to request to authenticate whether the user equipment is able to access the AP. Therefore, after receiving the user authentication request, the AC authenticates the user equipment. If the authentication is successful, the user equipment is allowed to access the AP.

The user authentication request may be specifically an Extensible Authentication Protocol (EAP)-subscriber identity module (SIM)/a third generation mobile communications network Authentication and Key Agreement (AKA) authentication request.

The user authentication request includes an identifier of the user equipment, used to identify the user equipment. The identifier of the user equipment is a uniform identifier of the user equipment for the AC and the first base station. That is, both the AC and the first base station may identify the user equipment according to the identifier of the user equipment. For example, the identifier of the user equipment may be an international mobile subscriber identity (IMSI) of the user equipment. Both the AC and the first base station may identify the user equipment according to the IMSI. For another example, the identifier of the user equipment may be an Internet Protocol (IP) address of the user equipment. Both the AC and the first base station may identify the user equipment according to the IP address.

102: The AC obtains an identifier of the user equipment from the user authentication request.

For example, the AC obtains the IMSI of the user equipment from the user authentication request.

103: The AC sends an inter-frequency measurement request to the user equipment according to the identifier of the user equipment.

In this embodiment, because a distance between the AP and the second base station is less than the first distance threshold, that is, the AP is close to the second base station, it may be considered that the signal coverage area of the AP basically overlaps with the signal coverage area of the second base station. Therefore, when the user equipment enters the signal coverage area of the AP, it may be considered that the user equipment enters the signal coverage area of the second base station. Therefore, the AC sends the inter-frequency measurement request to the user equipment according to the identifier of the user equipment obtained in step 102, where the inter-frequency measurement request is used to request the user equipment to start inter-frequency measurement. In this case, after receiving the inter-frequency measurement request, the user equipment starts inter-frequency measurement, and further determines, according to an inter-frequency measurement result, whether to be handed over to the second base station from the access device. If the user equipment enters the coverage area of the second base station, in a normal case, the user equipment can access the second base station according to the inter-frequency measurement result after starting inter-frequency measurement.

It can be known from the foregoing technical solution that, in this embodiment, the user terminal no longer determines, according to a relationship between the signal strength of the first base station and the starting threshold, whether to start inter-frequency measurement. Instead, when the AP is close to the second base station, it is considered that entering the signal coverage area of the AP is equivalent to entering the signal coverage area of the second base station, that is, entering the overlapping area. Therefore, when the user equipment enters the signal coverage area of the AP, the AC receives the user authentication request from the user equipment, and the AC obtains the identifier of the user equipment, and sends the inter-frequency measurement request to the user equipment according to the identifier of the user equipment, so that the user equipment starts inter-frequency measurement. Therefore, this manner resolves a prior-art problem that inter-frequency measurement is not started when the signal strength of the first base station is greater than the starting threshold, so that the second base station better performs offload on the first base station. In addition, in this manner, there is no need to set a high starting threshold, so that power consumption of the user equipment does not increase and a data transmission throughput is not affected.

In this embodiment, the user equipment needs to enable a wireless fidelity (Wi-Fi) function, so that the user equipment can send the user authentication request when entering the signal coverage area of the AP.

In this embodiment of the present disclosure, if the distance between the AP and the second base station is less than the first distance threshold, it indicates that the AP is close to the second base station. The AP and the second base station may be integrated into a same device. For example, the AP and the second base station are integrated into an enclosure and have a same power supply and a same transmission interface.

It is probable that the signal coverage area of the AP and the signal coverage area of the second base station are not entirely overlapping. However, in this embodiment, when the user equipment enters the signal coverage area of the AP, it is considered that the user equipment enters the signal coverage area of the second base station. In this case, some misjudgments may occur. To reduce such misjudgments and more accurately determine whether the user equipment enters the signal coverage area of the second base station, a second distance threshold may be set in this embodiment.

When a distance between the user equipment and the AP is less than the second distance threshold, that is, when the user equipment is closer to the AP, it is more probable that the user equipment enters the signal coverage area of the second base station. In this case, the AC sends the inter-frequency measurement request. Specifically, that the AC sends an inter-frequency measurement request to the user equipment in 103 includes: determining, by the AC, that the distance between the AP and the user equipment is less than the second distance threshold and sending the inter-frequency measurement request to the user equipment. The distance between the AP and the user equipment may be measured by the AP. In addition, the AP may determine that the distance between the AP and the user equipment is less than the second distance threshold, and instruct the AC to send the inter-frequency measurement request. Alternatively, the AP may send the measured distance to the AC, and the AC determines that the distance is less than the second distance threshold.

Generally, there is no directly connected connection channel between the AC and the user equipment. Therefore, the AC may send the inter-frequency measurement request to the user equipment according to an existing connection channel, for example, a connection channel between the AC and a base station device and a connection channel between the base station device and the user equipment. The base station device is the first base station or a base station controller of the first base station. Specifically, that the AC sends an inter-frequency measurement request to the user equipment in 103 includes: sending, by the AC, the inter-frequency measurement request to the user equipment by using the base station device. The AC also sends the identifier of the user equipment to the base station device, so that the base station device can send the inter-frequency measurement request to the user equipment corresponding to the identifier of the user equipment. The following uses a Universal Mobile Telecommunications System (UMTS) network, a Long Term Evolution (LTE) network, and a Global System for Mobile Communications (GSM) network as examples for description.

In the UMTS network, the base station device may be a radio network controller (RNC), and the AC sends the inter-frequency measurement request to the user equipment by using the RNC. In the LTE network, the base station device may be an evolved NodeB (eNodeB), and the AC sends the inter-frequency measurement request by using the eNodeB. In the GSM network, the base station device may be a base station controller (BSC), and the AC sends the inter-frequency measurement request to the user equipment by using the BSC.

In this embodiment, the AC may send the inter-frequency measurement request and the identifier of the user equipment to the base station device, and the base station device sends the inter-frequency measurement request to the user equipment according to the identifier of the user equipment. Alternatively, the AC may send the identifier of the user equipment to the base station device, and the base station device generates the inter-frequency measurement request, and sends the generated inter-frequency measurement request to the user equipment according to the identifier of the user equipment.

When the AC sends the identifier of the user equipment to the base station device, the AC may directly send the identifier to the base station device. Alternatively, the AC may send the identifier to the AP, the AP sends the identifier to the second base station, and the second base station sends the identifier to the base station device.

The foregoing describes, on the AC side, the method for starting inter-frequency measurement in this embodiment of present disclosure. The following describes, on a user equipment side, a method for starting inter-frequency measurement in an embodiment of the present disclosure.

Figure 3:
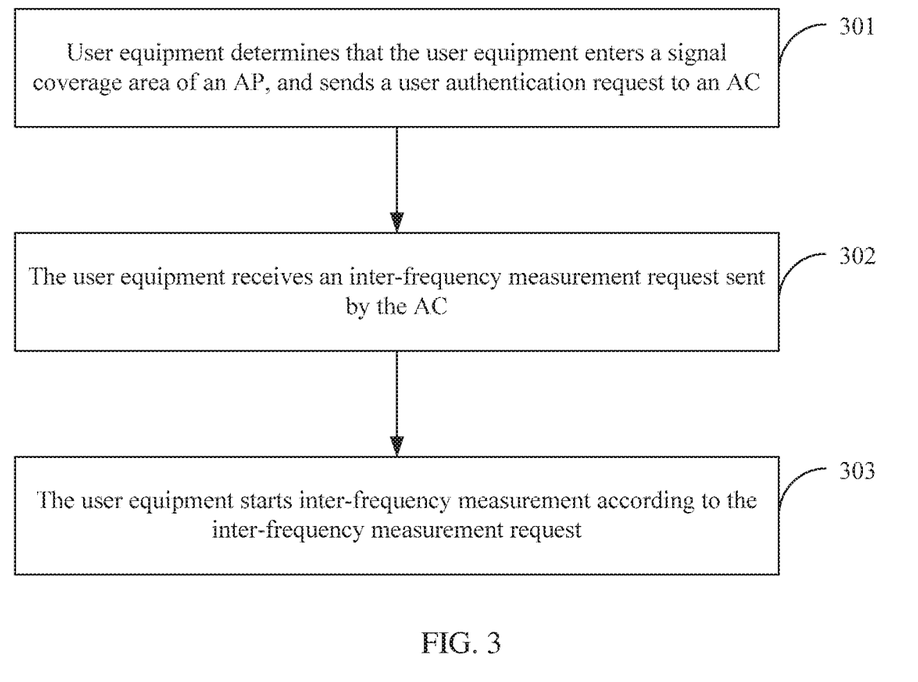
FIG. 3 is a schematic flowchart of another method embodiment according to an embodiment of the present disclosure.

Referring to FIG. 3, an embodiment of the present disclosure provides another method embodiment of a method for starting inter-frequency measurement.

The method in this embodiment is applied to an inter-frequency network. The inter-frequency network includes a first base station and a second base station. There is an overlapping area between a signal coverage area of the first base station and a signal coverage area of the second base station, that is, the signal coverage area of the first base station includes a part or the entire of the signal coverage area of the second base station. An access priority of the second base station is higher than an access priority of the first base station, and user equipment accesses the first base station. Therefore, when the user equipment that accesses the first base station enters the overlapping area, the user equipment needs to be handed over to the second base station from the access device. This indicates that the second base station is configured to perform offload on the first base station. The first base station and the second base station in the inter-frequency network are located in different frequencies.

In this embodiment, if a distance between the second base station and an AP is less than a distance threshold, it indicates that the second base station is close to the AP. For example, the distance threshold may be set to 0.5 meters. The AP is controlled by an AC. Specifically, the AC may control an access device of the AP. In this embodiment, the first base station may be a macro base station or a small cell, and the second base station may be a small cell. For example, as shown in FIG. 2, the first base station is a macro base station 21, the second base station is a small cell 22, a distance between the small cell 22 and an AP 23 is less than 0.5 meters, and an AC 24 is configured to control the AP 23. A distance between the small cell 22 and the AP 23 may be specifically a distance between a point of the small cell 22 closest to the AP 23 and a point of the AP 23 closest to the small cell 22. The AP 23 and the AC 24 form a wireless access system.

This embodiment includes the following steps.

301: The user equipment determines that the user equipment enters a signal coverage area of the AP, and sends a user authentication request to the AC.

When the user equipment enters the signal coverage area of the AP, the user equipment can discover the AP and send the user authentication request to the AC controlling the AP. The user authentication request is used to request to authenticate whether the user equipment is able to access the AP. Therefore, after receiving the user authentication request, the AC authenticates the user equipment. If the authentication is successful, the user equipment accesses the AP.

The user authentication request may be specifically an EAP-SIM/AKA authentication request.

The user authentication request includes an identifier of the user equipment, used to identify the user equipment. The identifier of the user equipment is a uniform identifier of the user equipment for the AC and the first base station. That is, both the AC and the first base station may identify the user equipment according to the identifier of the user equipment. For example, the identifier of the user equipment may be an IMSI of the user equipment. Both the AC and the first base station may identify the user equipment according to the IMSI. For another example, the identifier of the user equipment may be an IP address of the user equipment. Both the AC and the first base station may identify the user equipment according to the IP address.

The user authentication request is used to enable the AC to obtain the identifier of the user equipment from the user authentication request, and send an inter-frequency measurement request to the user equipment according to the identifier of the user equipment.

302: The user equipment receives an inter-frequency measurement request sent by the AC, where the inter-frequency measurement request is used to request the user equipment to start inter-frequency measurement.

303: The user equipment starts inter-frequency measurement according to the inter-frequency measurement request.

In this embodiment, because a distance between the AP and the second base station is less than the distance threshold, that is, the AP is close to the second base station, it may be considered that the signal coverage area of the AP basically overlaps with the signal coverage area of the second base station. Therefore, when the user equipment enters the signal coverage area of the AP, it may be considered that the user equipment enters the signal coverage area of the second base station. In this case, the AC sends the inter-frequency measurement request to the user equipment according to the identifier of the user equipment, where the inter-frequency measurement request is used to request the user equipment to start inter-frequency measurement. In this case, after receiving the inter-frequency measurement request, the user equipment starts inter-frequency measurement, and further determines, according to an inter-frequency measurement result, whether to be handed over to the second base station from the access device. If the user equipment enters the coverage area of the second base station, in a normal case, the user equipment can access the second base station according to the inter-frequency measurement result after starting inter-frequency measurement.

It can be known from the foregoing technical solution that, in this embodiment, the user terminal no longer determines, according to a relationship between the signal strength of the first base station and the starting threshold, whether to start inter-frequency measurement. Instead, when the AP is close to the second base station, it is considered that entering the signal coverage area of the AP is equivalent to entering the signal coverage area of the second base station, that is, entering the overlapping area. Therefore, when entering the signal coverage area of the AP, the user equipment sends the user authentication request to the AC, receives the inter-frequency measurement request sent by the AC, and starts inter-frequency measurement according to the inter-frequency measurement request. Therefore, this manner resolves a prior-art problem that inter-frequency measurement is not started when the signal strength of the first base station is greater than the starting threshold, so that the second base station better performs offload on the first base station. In addition, in this manner, there is no need to set a high starting threshold, so that power consumption of the user equipment does not increase and a data transmission throughput is not affected.

In this embodiment, the user equipment needs to enable a Wi-Fi function, so that the user equipment can send the user authentication request when entering the signal coverage area of the AP.

In this embodiment of the present disclosure, if the distance between the AP and the second base station is less than the distance threshold, it indicates that the AP is close to the second base station. The AP and the second base station may be integrated into a same device. For example, the AP and the second base station are integrated into an enclosure and have a same power supply and a same transmission interface.

Generally, there is no directly connected connection channel between the AC and the user equipment. Therefore, the user equipment may receive, according to an existing connection channel, for example, a connection channel between the AC and a first base station device and a connection channel between the first base station device and the user equipment, the inter-frequency measurement request sent by the AC. The first base station device is the first base station or a base station controller of the first base station. Specifically, that the user equipment receives an inter-frequency measurement request sent by the AC in 302 includes: receiving, by the user equipment, the inter-frequency measurement request sent by the AC by using the first base station device. The AC also sends the identifier of the user equipment to the first base station device, so that the first base station device can send the inter-frequency measurement request to the user equipment corresponding to the identifier of the user equipment. The following uses a UMTS network, an LTE network, and a GSM network as examples for description.

In the UMTS network, the first base station device may be an RNC, and the user equipment receives the inter-frequency measurement request sent by the AC by using the RNC. In the LTE network, the first base station device may be an eNodeB, and the user equipment receives the inter-frequency measurement request sent by the AC by using the eNodeB. In the GSM network, the first base station device may be a BSC, and the user equipment receives the inter-frequency measurement request sent by the AC by using the BSC.

In this embodiment, the AC may send the inter-frequency measurement request and the identifier of the user equipment to the first base station device, and the first base station device sends the inter-frequency measurement request to the user equipment according to the identifier of the user equipment. Alternatively, the AC may send the identifier of the user equipment to the first base station device, and the first base station device generates the inter-frequency measurement request, and sends the generated inter-frequency measurement request to the user equipment according to the identifier of the user equipment.

In this embodiment, after starting inter-frequency measurement, the user equipment may be further handed over from the access device according to the inter-frequency measurement result. Specifically, this embodiment may further include: the user equipment sends the inter-frequency measurement result to the second base station device; the user equipment receives an equipment handover request sent by the second base station device, where the equipment handover request is used to request the user equipment to access the second base station; and the user equipment accesses the second base station according to the equipment handover request, where the second base station device is the first base station or the base station controller of the first base station.

The foregoing describes the method embodiment of the method for starting inter-frequency measurement in this embodiment of the present disclosure. The following describes an AC and user equipment in embodiments of the present disclosure from a perspective of a modularized functional entity.

Figure 4:
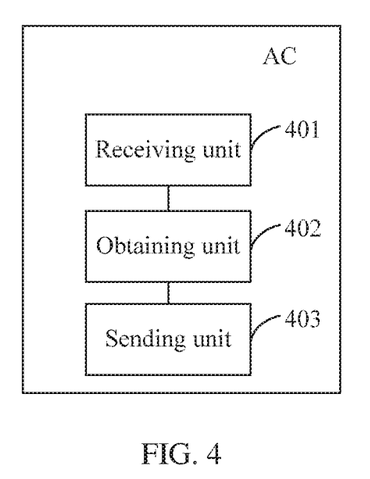
FIG. 4 is a schematic structural diagram of an apparatus embodiment of an AC according to an embodiment of the present disclosure.

Referring to FIG. 4, an embodiment of the present disclosure provides an apparatus embodiment of an AC.

The AC in this embodiment is used in an inter-frequency network. The inter-frequency network includes a first base station and a second base station. There is an overlapping area between a signal coverage area of the first base station and a signal coverage area of the second base station, that is, the signal coverage area of the first base station includes a part or the entire of the signal coverage area of the second base station. An access priority of the second base station is higher than an access priority of the first base station, and user equipment accesses the first base station. Therefore, when the user equipment that accesses the first base station enters the overlapping area, the user equipment needs to be handed over to the second base station from the access device. This indicates that the second base station is configured to perform offload on the first base station. The first base station and the second base station in the inter-frequency network are located in different frequencies.

In this embodiment, if a distance between the second base station and an AP is less than a first distance threshold, it indicates that the second base station is close to the AP. For example, the first distance threshold may be set to 0.5 meters. The AP is controlled by the AC. Specifically, the AC may control an access device of the AP. In this embodiment, the first base station may be a macro base station or a small cell, and the second base station may be a small cell. For example, as shown in FIG. 2, the first base station is a macro base station 21, the second base station is a small cell 22, a distance between the small cell 22 and an AP 23 is less than 0.5 meters, and an AC 24 is configured to control the AP 23. A distance between the small cell 22 and the AP 23 may be specifically a distance between a point of the small cell 22 closest to the AP 23 and a point of the AP 23 closest to the small cell 22. The AP 23 and the AC 24 form a wireless access system.

The AC in this embodiment includes a receiving unit 401, an obtaining unit 402, and a sending unit 403.

The receiving unit 401 is configured to receive a user authentication request sent by the user equipment.

When the user equipment enters a signal coverage area of the AP, the user equipment can discover the AP and send the user authentication request to the AC controlling the AP. The user authentication request is used to request to authenticate whether the user equipment is able to access the AP. Therefore, after receiving the user authentication request, the AC authenticates the user equipment. If the authentication is successful, the user equipment accesses the AP.

The user authentication request may be specifically an EAP-SIM/AKA authentication request.

The user authentication request includes an identifier of the user equipment, used to identify the user equipment. The identifier of the user equipment is a uniform identifier of the user equipment for the AC and the first base station. That is, both the AC and the first base station may identify the user equipment according to the identifier of the user equipment. For example, the identifier of the user equipment may be an IMSI of the user equipment. Both the AC and the first base station may identify the user equipment according to the IMSI. For another example, the identifier of the user equipment may be an IP address of the user equipment. Both the AC and the first base station may identify the user equipment according to the IP address.

The obtaining unit 402 is configured to obtain an identifier of the user equipment from the user authentication request.

For example, the obtaining unit 402 obtains the IMSI of the user equipment from the user authentication request.

The sending unit 403 is configured to send an inter-frequency measurement request to the user equipment according to the identifier of the user equipment.

In this embodiment, because a distance between the AP and the second base station is less than the first distance threshold, that is, the AP is close to the second base station, it may be considered that the signal coverage area of the AP basically overlaps with the signal coverage area of the second base station. Therefore, when the user equipment enters the signal coverage area of the AP, it may be considered that the user equipment enters the signal coverage area of the second base station. Therefore, the sending unit 403 sends the inter-frequency measurement request to the user equipment according to the identifier of the user equipment obtained by the obtaining unit 402. The inter-frequency measurement request is used to request the user equipment to start inter-frequency measurement. In this case, after receiving the inter-frequency measurement request, the user equipment starts inter-frequency measurement, and further determines, according to an inter-frequency measurement result, whether to be handed over to the second base station from the access device. If the user equipment enters the coverage area of the second base station, in a normal case, the user equipment can access the second base station according to the inter-frequency measurement result after starting inter-frequency measurement.

It can be known from the foregoing technical solution that, in this embodiment, the user terminal no longer determines, according to a relationship between the signal strength of the first base station and the starting threshold, whether to start inter-frequency measurement. Instead, when the AP is close to the second base station, it is considered that entering the signal coverage area of the AP is equivalent to entering the signal coverage area of the second base station, that is, entering the overlapping area. Therefore, when the user equipment enters the signal coverage area of the AP, the receiving unit 401 receives the user authentication request from the user equipment, the obtaining unit 402 obtains the identifier of the user equipment, and the sending unit 403 sends the inter-frequency measurement request to the user equipment according to the identifier of the user equipment, so that the user equipment starts inter-frequency measurement. Therefore, this manner resolves a prior-art problem that inter-frequency measurement is not started when the signal strength of the first base station is greater than the starting threshold, so that the second base station better performs offload on the first base station. In addition, in this manner, there is no need to set a high starting threshold, so that power consumption of the user equipment does not increase and a data transmission throughput is not affected.

In this embodiment, the user equipment needs to enable a Wi-Fi function, so that the user equipment can send the user authentication request when entering the signal coverage area of the AP.

In this embodiment of the present disclosure, if the distance between the AP and the second base station is less than the first distance threshold, it indicates that the AP is close to the second base station. The AP and the second base station may be integrated into a same device. For example, the AP and the second base station are integrated into an enclosure and have a same power supply and a same transmission interface.

The signal coverage area of the AP and the signal coverage area of the second base station possibly are not completely overlapping. However, in this embodiment, when the user equipment enters the signal coverage area of the AP, it is considered that the user equipment enters the signal coverage area of the second base station. In this case, some misjudgments may occur. To reduce such misjudgments and more accurately determine whether the user equipment enters the signal coverage area of the second base station, a second distance threshold may be set in this embodiment. When a distance between the user equipment and the AP is less than the second distance threshold, that is, when the user equipment is closer to the AP, it is more probable that the user equipment enters the signal coverage area of the second base station. In this case, the AC sends the inter-frequency measurement request. Specifically, when the inter-frequency measurement request is sent to the user equipment, the sending unit 403 is specifically configured to determine that the distance between the AP and the user equipment is less than the second distance threshold, and send the inter-frequency measurement request to the user equipment. The distance between the AP and the user equipment may be measured by the AP. In addition, the AP may determine that the distance between the AP and the user equipment is less than the second distance threshold, and instruct the sending unit 403 to send the inter-frequency measurement request. Alternatively, the AP sends the measured distance to the AC, and the sending unit 403 determines that the distance is less than the second distance threshold.

Generally, there is no directly connected connection channel between the AC and the user equipment. Therefore, the AC may send the inter-frequency measurement request to the user equipment according to an existing connection channel, for example, a connection channel between the AC and a base station device and a connection channel between the base station device and the user equipment. The base station device is the first base station or a base station controller of the first base station. Specifically, when sending the inter-frequency measurement request to the user equipment, the sending unit 403 is specifically configured to send the inter-frequency measurement request to the user equipment by using the base station device. The sending unit 403 also sends the identifier of the user equipment to the base station device, so that the base station device can send the inter-frequency measurement request to the user equipment corresponding to the identifier of the user equipment. The following uses a UMTS network, an LTE network, and a GSM network as examples for description.

In the UMTS network, the base station device may be an RNC, and the sending unit 403 sends the inter-frequency measurement request to the user equipment by using the RNC. In the LTE network, the base station device may be an eNodeB, and the sending unit 403 sends the inter-frequency measurement request by using the eNodeB. In the GSM network, the base station device may be a BSC, and the sending unit 403 sends the inter-frequency measurement request to the user equipment by using the BSC.

In this embodiment, the sending unit 403 may send the inter-frequency measurement request and the identifier of the user equipment to the base station device, and the base station device sends the inter-frequency measurement request to the user equipment according to the identifier of the user equipment. Alternatively, the sending unit 403 may send the identifier of the user equipment to the base station device, and the base station device generates the inter-frequency measurement request, and sends the generated inter-frequency measurement request to the user equipment according to the identifier of the user equipment.

When the sending unit 403 sends the identifier of the user equipment to the base station device, the sending unit 403 may directly send the identifier to the base station device. Alternatively, the sending unit 403 may send the identifier to the AP, the AP sends the identifier to the second base station, and the second base station sends the identifier to the base station device.

The foregoing describes, on the AC side, this embodiment of the present disclosure, and the following describes, on a user equipment side, an embodiment of the present disclosure.

Figure 5:
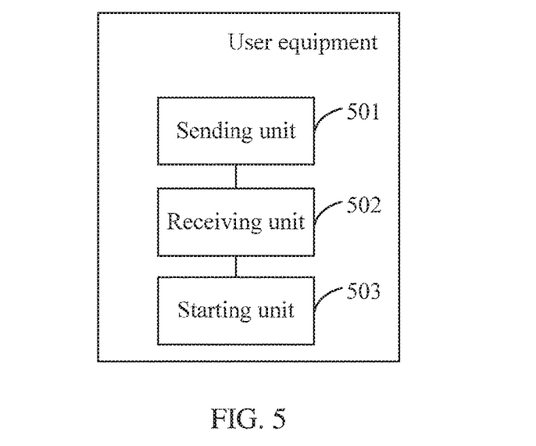
FIG. 5 is a schematic structural diagram of an apparatus embodiment of user equipment according to an embodiment of the present disclosure.

Referring to FIG. 5, an embodiment of the present disclosure provides an apparatus embodiment of user equipment.

The user equipment in this embodiment is used in an inter-frequency network. The inter-frequency network includes a first base station and a second base station. There is an overlapping area between a signal coverage area of the first base station and a signal coverage area of the second base station, that is, the signal coverage area of the first base station includes a part or the entire of the signal coverage area of the second base station. An access priority of the second base station is higher than an access priority of the first base station, and the user equipment accesses the first base station. Therefore, when the user equipment that accesses the first base station enters the overlapping area, the user equipment needs to be handed over to the second base station from the access device. This indicates that the second base station is configured to perform offload on the first base station. The first base station and the second base station in the inter-frequency network are located in different frequencies.

In this embodiment, if a distance between the second base station and an AP is less than a distance threshold, it indicates that the second base station is close to the AP. For example, the distance threshold may be set to 0.5 meters. The AP is controlled by an AC. Specifically, the AC may control an access device of the AP. In this embodiment, the first base station may be a macro base station or a small cell, and the second base station may be a small cell. For example, as shown in FIG. 2, the first base station is a macro base station 21, the second base station is a small cell 22, a distance between the small cell 22 and an AP 23 is less than 0.5 meters, and an AC 24 is configured to control the AP 23. A distance between the small cell 22 and the AP 23 may be specifically a distance between a point of the small cell 22 closest to the AP 23 and a point of the AP 23 closest to the small cell 22. The AP 23 and the AC 24 form a wireless access system.

The user equipment in this embodiment includes a sending unit 501, a receiving unit 502, and a starting unit 503.

The sending unit 501 is configured to determine that the user equipment enters a signal coverage area of the AP, and send a user authentication request to the AC.

When the user equipment enters the signal coverage area of the AP, the user equipment can discover the AP, and the sending unit 501 sends the user authentication request to the AC controlling the AP. The user authentication request is used to request to authenticate whether the user equipment is able to access the AP. Therefore, after receiving the user authentication request, the AC authenticates the user equipment. If the authentication is successful, the user equipment accesses the AP.

The user authentication request may be specifically EAP-SIM/AKA authentication.

The user authentication request includes an identifier of the user equipment, used to identify the user equipment. The identifier of the user equipment is a uniform identifier of the user equipment for the AC and the first base station. That is, both the AC and the first base station may identify the user equipment according to the identifier of the user equipment. For example, the identifier of the user equipment may be an IMSI of the user equipment. Both the AC and the first base station may identify the user equipment according to the IMSI. For another example, the identifier of the user equipment may be an IP address of the user equipment. Both the AC and the first base station may identify the user equipment according to the IP address.

The user authentication request is used to enable the AC to obtain the identifier of the user equipment from the user authentication request, and send an inter-frequency measurement request to the user equipment according to the identifier of the user equipment.

The receiving unit 502 is configured to receive an inter-frequency measurement request sent by the AC, where the inter-frequency measurement request is used to request the user equipment to start inter-frequency measurement.

The starting unit 503 is configured to start inter-frequency measurement according to the inter-frequency measurement request.

In this embodiment, because a distance between the AP and the second base station is less than the distance threshold, that is, the AP is close to the second base station, it may be considered that the signal coverage area of the AP basically overlaps with the signal coverage area of the second base station. Therefore, when the user equipment enters the signal coverage area of the AP, it may be considered that the user equipment enters the signal coverage area of the second base station. In this case, the AC sends the inter-frequency measurement request to the user equipment according to the identifier of the user equipment, where the inter-frequency measurement request is used to request the user equipment to start inter-frequency measurement. Therefore, after the receiving unit 502 receives the inter-frequency measurement request, inter-frequency measurement is started, and the user equipment further determines, according to an inter-frequency measurement result, whether to be handed over to the second base station from the access device. If the user equipment enters the coverage area of the second base station, in a normal case, the user equipment can access the second base station according to the inter-frequency measurement result after the starting unit 503 starts inter-frequency measurement.

It can be known from the foregoing technical solution that, in this embodiment, the user terminal no longer determines, according to a relationship between the signal strength of the first base station and the starting threshold, whether to start inter-frequency measurement. Instead, when the AP is close to the second base station, it is considered that entering the signal coverage area of the AP is equivalent to entering the signal coverage area of the second base station, that is, entering the overlapping area. Therefore, when the user equipment enters the signal coverage area of the AP, the sending unit 501 sends the user authentication request to the AC, the receiving unit 502 receives the inter-frequency measurement request sent by the AC, and the starting unit 503 starts inter-frequency measurement according to the inter-frequency measurement request. Therefore, this manner resolves a prior-art problem that inter-frequency measurement is not started when the signal strength of the first base station is greater than the starting threshold, so that the second base station better performs offload on the first base station. In addition, in this manner, there is no need to set a high starting threshold, so that power consumption of the user equipment does not increase and a data transmission throughput is not affected.

In this embodiment, the user equipment needs to enable a Wi-Fi function, so that the sending unit 501 can send the user authentication request when the user equipment enters the signal coverage area of the AP.

In this embodiment of the present disclosure, if the distance between the AP and the second base station is less than the distance threshold, it indicates that the AP is close to the second base station. The AP and the second base station may be integrated into a same device. For example, the AP and the second base station are integrated into an enclosure and have a same power supply and a same transmission interface.

Generally, there is no directly connected connection channel between the AC and the user equipment. Therefore, the receiving unit 502 may receive, according to an existing connection channel, for example, a connection channel between the AC and a first base station device and a connection channel between the first base station device and the user equipment, the inter-frequency measurement request sent by the AC. The first base station device is the first base station or a base station controller of the first base station. Specifically, when receiving the inter-frequency measurement request sent by the AC, the receiving unit 502 is specifically configured to receive the inter-frequency measurement request sent by the AC by using the first base station device. The AC also sends the identifier of the user equipment to the first base station device, so that the first base station device can send the inter-frequency measurement request to the user equipment corresponding to the identifier of the user equipment. The following uses a UMTS network, an LTE network, and a GSM network as examples for description.

In the UMTS network, the first base station device may be an RNC, and the receiving unit 502 receives the inter-frequency measurement request sent by the AC by using the RNC. In the LTE network, the first base station device may be an eNodeB, and the receiving unit 502 receives the inter-frequency measurement request sent by the AC by using the eNodeB. In the GSM network, the first base station device may be a BSC, and the receiving unit 502 receives the inter-frequency measurement request sent by the AC by using the BSC.

In this embodiment, the AC may send the inter-frequency measurement request and the identifier of the user equipment to the first base station device, and the first base station device sends the inter-frequency measurement request to the receiving unit 502 according to the identifier of the user equipment. Alternatively, the AC may send the identifier of the user equipment to the first base station device, and the first base station device generates the inter-frequency measurement request, and sends the generated inter-frequency measurement request to the receiving unit 502 according to the identifier of the user equipment.

In this embodiment, after starting inter-frequency measurement, the user equipment may be further handed over from the access device according to the inter-frequency measurement result. Specifically, the user equipment device may further include a handover unit. The sending unit 501 is further configured to send the inter-frequency measurement result to the second base station device. The receiving unit 502 is further configured to receive an equipment handover request sent by the second base station device, where the equipment handover request is used to request the user equipment to access the second base station. The handover unit is configured to access the second base station according to the equipment handover request. The second base station device is the first base station or the base station controller of the first base station.

The foregoing describes the AC and the user equipment in the embodiments of the present disclosure from a perspective of a modularized functional entity. The following describes an AC and user equipment in embodiments of the present disclosure from a perspective of hardware processing.

Figure 6:
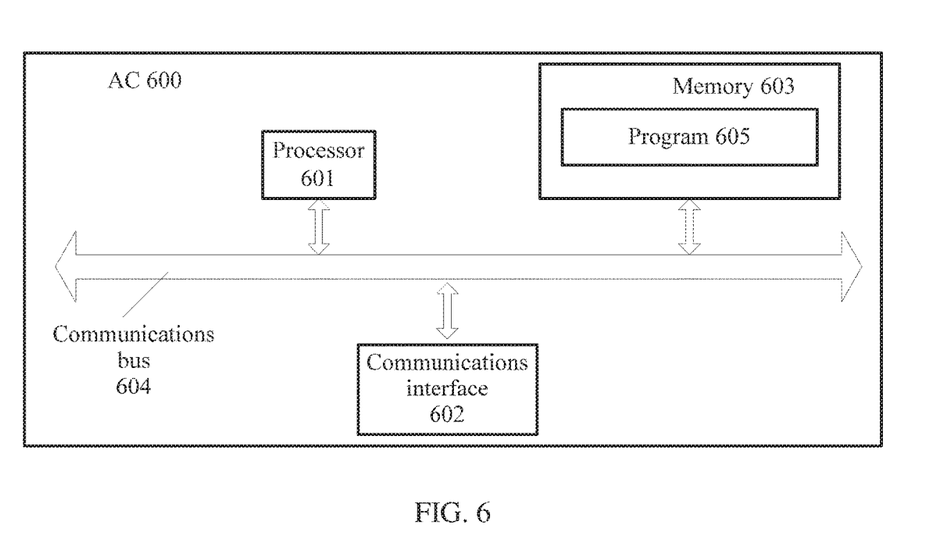
FIG. 6 is a schematic structural diagram of another apparatus embodiment of an AC according to an embodiment of the present disclosure.

Referring to FIG. 6, an embodiment of the present disclosure provides another apparatus embodiment of an AC.

The AC 600 in this embodiment is used in an inter-frequency network, the inter-frequency network includes a first base station and a second base station, there is an overlapping area between a signal coverage area of the first base station and a signal coverage area of the second base station, an access priority of the second base station is higher than an access priority of the first base station, and the first base station and the second base station are located in different frequencies. User equipment accesses the first base station. A distance between the second base station and a wireless access point AP is less than a first distance threshold, and the AP is controlled by the AC.

The AC 600 in this embodiment specifically includes a processor (processor) 601, a communications interface (Communications Interface) 602, a memory (memory) 603, and a communications bus 604.

The processor 601, the communications interface 602, and the memory 603 communicate with each other by using the bus 604.

The processor 601 is configured to execute a program 605.

Specifically, the program 605 may include program code, where the program code includes a computer operation instruction.

The processor 601 may be a central processing unit CPU, or an application-specific integrated circuit ASIC (Application Specific Integrated Circuit), or one or more integrated circuits configured to implement this embodiment of this application.

The memory 603 is configured to store the program 605. The memory 603 may include a high-speed RAM memory, and may further include a non-volatile memory (non-volatile memory), such as at least one disk memory. The program 605 is used to perform the following steps:

receiving a user authentication request sent by the user equipment, where the user authentication request is used to request to authenticate whether the user equipment is able to access the AP, and the user authentication request includes an identifier of the user equipment;

obtaining the identifier of the user equipment from the user authentication request; and sending an inter-frequency measurement request to the user equipment according to the identifier of the user equipment, where the inter-frequency measurement request is used to request the user equipment to start inter-frequency measurement.

For specific implementation of various steps in the program 605, refer to implementations of the corresponding units in the embodiment shown in FIG. 4, and details are not described herein.

Figure 7:
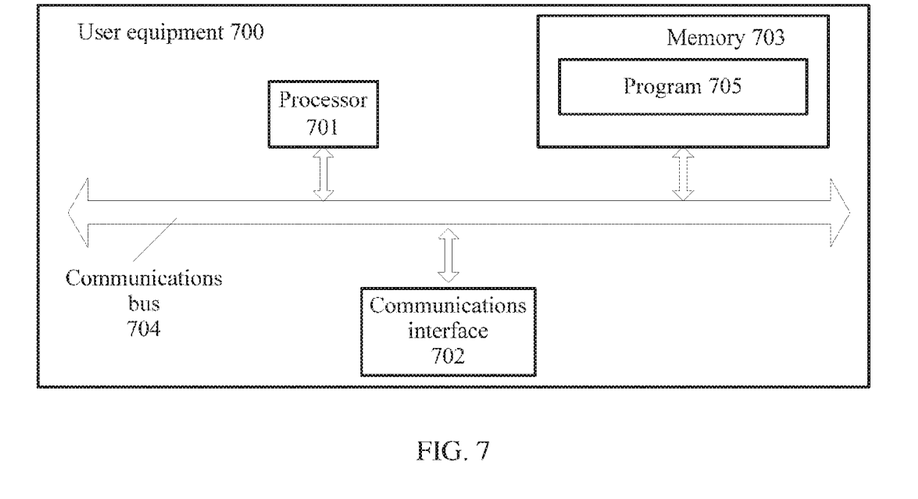
FIG. 7 is a schematic structural diagram of another apparatus embodiment of user equipment according to an embodiment of the present disclosure.

Referring to FIG. 7, an embodiment of the present disclosure provides another apparatus embodiment of user equipment.

The user equipment 700 in this embodiment is used in an inter-frequency network, the inter-frequency network includes a first base station and a second base station, there is an overlapping area between a signal coverage area of the first base station and a signal coverage area of the second base station, an access priority of the second base station is higher than an access priority of the first base station, and the first base station and the second base station are located in different frequencies. The user equipment accesses the first base station. A distance between the second base station and a wireless access point AP is less than a first distance threshold, and the AP is controlled by an access controller AC.

The user equipment 700 in this embodiment specifically includes a processor 701, a communications interface 702, a memory 703, and a communications bus 704.

The processor 701, the communications interface 702, and the memory 703 communicate with each other by using the bus 704.

The processor 701 is configured to execute a program 705.

Specifically, the program 705 may include program code, where the program code includes a computer operation instruction.

The processor 701 may be a central processing unit CPU, or an application-specific integrated circuit ASIC (Application Specific Integrated Circuit), or one or more integrated circuits configured to implement this embodiment of this application.

The memory 703 is configured to store the program 705. The memory 703 may include a high-speed RAM memory, and may further include a non-volatile memory, such as at least one disk memory. The program 705 is used to perform the following steps:

determining that the user equipment enters a signal coverage area of the AP, and sending a user authentication request to the AC, where the user authentication request is used to request to authenticate whether the user equipment is able to access the AP, and the user authentication request includes an identifier of the user equipment;

receiving an inter-frequency measurement request sent by the AC, where the inter-frequency measurement request is used to request the user equipment to start inter-frequency measurement; and starting inter-frequency measurement according to the inter-frequency measurement request.

For specific implementation of various steps in the program 705, refer to implementations of the corresponding units in the embodiment shown in the FIG. 5, and details are not described herein.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a portable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A method for starting inter-frequency measurement, wherein the method is applied to an inter-frequency network comprising a first base station and a second base station, there is an overlapping area between a signal coverage area of the first base station and a signal coverage area of the second base station, an access priority of the second base station is higher than an access priority of the first base station, the first base station and the second base station are located in different frequencies, a distance between the second base station and a wireless access point (AP) is less than a first distance threshold, and the AP is controlled by an access controller (AC), the method comprising:
   receiving, by the AC, a user authentication request sent by a user equipment for requesting to authenticate whether the user equipment is able to access the AP, and wherein the user authentication request comprises an identifier of the user equipment; and
   sending, by the AC, an inter-frequency measurement request to the user equipment according to the identifier of the user equipment for requesting the user equipment to start inter-frequency measurement.

2. The method according to claim 1, wherein sending, by the AC, an inter-frequency measurement request to the user equipment comprises:
   determining, by the AC, that a distance between the AP and the user equipment is less than a second distance threshold, and sending the inter-frequency measurement request to the user equipment.

3. The method according to claim 1, wherein sending, by the AC, an inter-frequency measurement request to the user equipment comprises:
   sending, by the AC, the inter-frequency measurement request to the user equipment by using a base station device.

4. The method according to claim 3, wherein the base station device is the first base station or a base station controller of the first base station.

5. A method for starting inter-frequency measurement, wherein the method is applied to an inter-frequency network comprising a first base station and a second base station, there is an overlapping area between a signal coverage area of the first base station and a signal coverage area of the second base station, an access priority of the second base station is higher than an access priority of the first base station, the first base station and the second base station are located in different frequencies, a distance between the second base station and a wireless access point (AP) is less than a distance threshold, and the AP is controlled by an access controller (AC), the method comprising:
   determining, by the user equipment, that the user equipment enters a signal coverage area of the AP, and sending a user authentication request to the AC for requesting to authenticate whether the user equipment is able to access the AP, and wherein the user authentication request comprises an identifier of the user equipment;
   receiving, by the user equipment, an inter-frequency measurement request sent by the AC for requesting the user equipment to start inter-frequency measurement; and
   starting, by the user equipment, inter-frequency measurement according to the inter-frequency measurement request.

6. The method according to claim 5, wherein receiving, by the user equipment, an inter-frequency measurement request sent by the AC comprises:
   receiving, by the user equipment, the inter-frequency measurement request sent by the AC by using a first base station device.

7. The method according to claim 6, wherein the first base station device is the first base station or a base station controller of the first base station.

8. The method according to claim 5, further comprising:
   sending, by the user equipment, a measurement result of inter-frequency measurement to a second base station device;
   receiving, by the user equipment, an equipment handover request sent by the second base station device for requesting the user equipment to access the second base station; and
   accessing, by the user equipment, the second base station according to the equipment handover request.

9. The method according to claim 8, wherein the second base station device is the first base station or the base station controller of the first base station.

10. An access controller (AC) for use in an inter-frequency network comprising a first base station and a second base station, there is an overlapping area between a signal coverage area of the first base station and a signal coverage area of the second base station, an access priority of the second base station is higher than an access priority of the first base station, the first base station and the second base station are located in different frequencies, a distance between the second base station and a wireless access point (AP) is less than a first distance threshold, and the AP is controlled by the AC; the AC comprising:
- a receiving unit, configured to receive a user authentication request sent by the user equipment for requesting to authenticate whether the user equipment is able to access the AP, and wherein the user authentication request comprises an identifier of the user equipment; and
- a sending unit, configured to send an inter-frequency measurement request to the user equipment according to the identifier of the user equipment for requesting the user equipment to start inter-frequency measurement.

11. The AC according to claim 10, wherein to send an inter-frequency measurement request to the user equipment, the sending unit is configured to:
  determine that a distance between the AP and the user equipment is less than a second distance threshold, and send the inter-frequency measurement request to the user equipment.

12. The AC according to claim 10, wherein to send an inter-frequency measurement request to the user equipment, the sending unit is configured to:
  send the inter-frequency measurement request to the user equipment by using a base station device.

13. The AC according to claim 12, wherein the base station device is the first base station or a base station controller of the first base station.

14. User equipment for use in an inter-frequency network comprising a first base station and a second base station, there is an overlapping area between a signal coverage area of the first base station and a signal coverage area of the second base station, an access priority of the second base station is higher than an access priority of the first base station, the first base station and the second base station are located in different frequencies, a distance between the second base station and a wireless access point (AP) is less than a distance threshold, and the AP is controlled by an access controller (AC), the user equipment comprising:
- a sending unit, configured to determine that the user equipment enters a signal coverage area of the AP, and send a user authentication request to the AC, wherein the user authentication request is used to request to authenticate whether the user equipment is able to access the AP, and the user authentication request comprises an identifier of the user equipment;
- a receiving unit, configured to receive an inter-frequency measurement request sent by the AC, wherein the inter-frequency measurement request is used to request the user equipment to start inter-frequency measurement; and
- a starting unit, configured to start inter-frequency measurement according to the inter-frequency measurement request.

15. The user equipment according to claim 14, wherein to receive an inter-frequency measurement request sent by the AC, the receiving unit is configured to:
  receive the inter-frequency measurement request sent by the AC by using a first base station device.

16. The user equipment according to claim 15, wherein the first base station device is the first base station or a base station controller of the first base station.

17. The user equipment according to claim 14, wherein:
  the user equipment further comprises a handover unit;
  the sending unit is further configured to send a measurement result of inter-frequency measurement to a second base station device;
  the receiving unit is further configured to receive an equipment handover request sent by the second base station device for requesting the user equipment to access the second base station; and
  wherein the handover unit is configured to access the second base station according to the equipment handover request.

18. The user equipment according to claim 17, wherein the second base station device is the first base station or the base station controller of the first base station.

* * * * *